(12) United States Patent
Yang (10) Patent No.: US 11,081,077 B2
(45) Date of Patent: Aug. 3, 2021

(54) DISPLAY DEVICE CAPABLE OF IMPROVING VERTICAL CROSSTALK

(71) Applicants: HKC Corporation Limited, Guangdong (CN); Chongqing HKC Optoelectronics Technology Co., Ltd., Chongqing (CN)

(72) Inventor: Chun-Hui Yang, Chongqing (CN)

(73) Assignees: HKC Corporation Limited, Shenzhen (CN); Chongqing HKC Optoelectronics Technology Co., Ltd., Chongqing (CN)

( * ) Notice: Subject to any disclaimer, the term of this patent is extended or adjusted under 35 U.S.C. 154(b) by 0 days.

(21) Appl. No.: 16/959,752

(22) PCT Filed: Dec. 29, 2018

(86) PCT No.: PCT/CN2018/125461
§ 371 (c)(1),
(2) Date: Jul. 2, 2020

(87) PCT Pub. No.: WO2019/134614
PCT Pub. Date: Jul. 11, 2019

(65) Prior Publication Data
US 2021/0142755 A1 May 13, 2021

(30) Foreign Application Priority Data
Jan. 3, 2018 (CN) .......................... 201810003549.4

(51) Int. Cl.
*G09G 3/36* (2006.01)
*G02F 1/1362* (2006.01)

(52) U.S. Cl.
CPC ..... *G09G 3/3688* (2013.01); *G02F 1/136286* (2013.01); *G09G 3/3607* (2013.01);
(Continued)

(58) Field of Classification Search
CPC .. G09G 3/3688; G09G 3/3607; G09G 3/3677; G09G 2300/0452; G09G 2310/0278; G02F 1/136286
See application file for complete search history.

(56) References Cited

U.S. PATENT DOCUMENTS

| 2014/0118325 A1* | 5/2014 | Im ........................ G09G 3/3614 345/212 |
| 2015/0206491 A1 | 7/2015 | Cho |
| 2018/0261169 A1* | 9/2018 | Du ........................ G09G 3/3614 |

FOREIGN PATENT DOCUMENTS

| CN | 105319793 A | 2/2016 |
| CN | 105892182 A | 8/2016 |
| CN | 108257563 A | 7/2018 |

* cited by examiner

*Primary Examiner* — Kwang-Su Yang
(74) *Attorney, Agent, or Firm* — Muncy, Geissler, Olds & Lowe, P.C.

(57) ABSTRACT

A display device is disclosed. Plural sub-pixels of a display panel are connected to two adjacent gate lines. Each data line is connected to two adjacent sub-pixels of same pixel. In first or second pixel sets, the first and the fourth gate lines are connected to sub-pixels in same column. The second and the third gate lines are connected to sub-pixels in same column. The sub-pixels connected to the fourth gate line of the first pixel set and the first gate line of the second pixel set are located in different columns. In one frame time, the data signal drives same pixel through the $n^{th}$ and $(n+1)^{th}$ data lines using opposite polarities and the data signal drives two adjacent sub-pixels of same pixel set in column direction through the $n^{th}$ and $(n+1)^{th}$ data lines using the same polarities.

20 Claims, 4 Drawing Sheets

(52) U.S. Cl.
CPC ... *G09G 3/3677* (2013.01); *G09G 2300/0452* (2013.01); *G09G 2310/0278* (2013.01)

DISPLAY DEVICE CAPABLE OF IMPROVING VERTICAL CROSSTALK

BACKGROUND OF THE INVENTION

Technical Field

This disclosure relates to a display device, and more particularly to a display device capable of improving a vertical crosstalk problem.

Related Art

With the advancement of technology, flat panel displays (more particularly liquid crystal display devices) have been widely used in various fields, and thus have the superior features including the thin body, the low power consumption and the radiationless property, gradually replaced the conventional Cathode Radial Tube display devices, and applied to various electronic products, such as mobile phones, portable multimedia devices, notebook computers, liquid crystal televisions, liquid crystal screens and the like.

A liquid crystal display device mainly utilizes an electric field to control rotations of liquid crystal molecules to make light rays penetrate through the liquid crystal molecules to display an image. A pixel includes four colors of sub-pixels arranged in, for example, WRGB, and thus has the advantage of the high transmittance. At present, the liquid crystal display device has been accepted in the market, and various manufacturers have started to develop this new technology on this basis. With the continuous increases in the Pixel Per Inch and the scan frequency of the display and in order to decrease the number of the source drive ICs, there are many products each having the pixel arrangement modified from the vertical arrangement of one gate line collocating with one data line (1G1D) into half source driving (HSD) of two gate lines collocating with one data line. The HSD technology can decrease the number of the source drive ICs as well as advantageously increase the production capacity.

In addition, in order to increase the aperture ratio and the view angle, the current product tends to use the 4-domain two-pixel rendering technology, wherein the combination of two sub-pixels is utilized and different voltages are used to control different orientations of liquid crystals to render one dark and one bright (two) sub-pixels. In addition, in order to make the display frame become more uniform, the prior art also utilizes the checkerboard pattern arrangement of the 4-domain sub-pixels of the dark area and the 4-domain sub-pixels of the bright area include the design method of two different polarities (positive and negative polarities) in the overall display to decrease the flicker of the display frame. However, the main problem of this pixel design is that the same colors of sub-pixels cannot mutually offset in one frame time due to the parasitic capacitance coupling, so that the vertical crosstalk of the display frame is induced, and the frame taste is deteriorated.

SUMMARY

In view of the deficiencies of the prior art, the inventor has obtained this disclosure after the research and development have been made. An objective of this disclosure is to provide a display device capable of improving a vertical crosstalk problem.

To achieve the above objective, the present disclosure discloses a display device. The display device comprises a display pane. The display panel comprises a plurality of gate lines, a plurality of data lines, a plurality of pixels, and a drive circuit. The plurality of data lines are interleaved with the plurality of gate lines, and the plurality of data lines comprise an $n^{th}$ data line and an $(n+1)^{th}$ data line, where n is an odd number. The plurality of pixels are arranged in a row direction and a column direction, wherein each of the pixels comprises plurality of colors of sub-pixels arranged in the row direction. The plurality of sub-pixels arranged in the row direction are electrically connected to two adjacent gate lines of the corresponding row. Each of the data lines is electrically connected to the two adjacent sub-pixels of the same pixel. Two adjacent pixels are arranged in the column direction respectively form a pixel set. Two adjacent pixel sets arranged in the column direction are a first pixel set and a second pixel set. The first pixel set and the second pixel set are respectively connected to a first gate line, a second gate line, a third gate line and a fourth gate line. In the first pixel set or the second pixel set, the first gate line and the fourth gate line are electrically connected to the sub-pixels in the same column, respectively. The second gate line and the third gate line are respectively electrically connected to the sub-pixels in the same column. The sub-pixels respectively electrically connected to the fourth gate line of the first pixel set and the first gate line of the second pixel set are located in different columns. The drive circuit transmits a data signal to drive the plurality of pixels through the plurality of data lines. In one frame time, the data signal drives the two adjacent sub-pixels of the same pixel through the $n^{th}$ data line or the $(n+1)^{th}$ data line using opposite polarities, the data signal drives the same pixel through the $n^{th}$ data line and the $(n+1)^{th}$ data line using opposite polarities, and the data signal drives the two adjacent sub-pixels of the same pixel set in column-direction through the $n^{th}$ data line and the $(n+1)^{th}$ data line using the same polarities.

In one embodiment, the plurality of gate lines and the plurality of data lines are interleaved and respectively electrically connected to the plurality of pixels.

In one embodiment, the drive circuit comprises a scan driving unit and a data driving unit, the scan driving unit is coupled to the plurality of pixels through the plurality of gate lines, and the data driving unit is coupled to the plurality of pixels through the plurality of data lines.

In one embodiment, in one frame time, when the plurality of gate lines are sequentially turned on respectively, the data driving unit transmits the data signal corresponding to each row of sub-pixels to each of the sub-pixels through the plurality of data lines to display an image in the display panel.

In one embodiment, each of the pixels is electrically connected to two of the data lines.

In one embodiment, the plurality of colors of the sub-pixels of each of the pixels of the same row have the same order.

In one embodiment, the $n^{th}$ data line and the $(n+1)^{th}$ data line are connected to the same pixel.

In one embodiment, the data signal drives the two adjacent sub-pixels of the first pixel set and the second pixel set arranged in the column direction through the $n^{th}$ data line or the $(n+1)^{th}$ data line using opposite polarities.

In one embodiment, the two adjacent sub-pixels of the same pixel connected to the $n^{th}$ data line and the $(n+1)^{th}$ data line have the same polarity.

In one embodiment, the plurality of sub-pixels of each of the pixels in the same row have voltage polarity in the same order.

In one embodiment, each of the pixels comprises sub-pixels of four colors arranged in the row direction.

In one embodiment, the four colors of the sub-pixels are respectively WRGB, RGBY or RGBC, where W denotes white, R denotes red, G denotes green, B denotes blue, Y denotes yellow, and C denotes cyan.

In one embodiment, in one frame time, polarity orders of the sub-pixels driven by the data signal through the $n^{th}$ data line in the column direction are negative, positive, positive, negative, negative, positive, positive, and negative, and the orders are respectively repeated; polarity orders of the sub-pixels driven by the data signal through the $(n+1)^{th}$ data line in the column direction are positive, negative, negative, positive, positive, negative, negative, and positive, and the orders are respectively repeated.

In one embodiment, the colors of the sub-pixels connected to the $n^{th}$ data line are sequentially WRRWRWWR, and the order is repeated; and the colors of the sub-pixels connected to the $(n+1)^{th}$ data line are sequentially GBBGBGGB, and the order is repeated, where W denotes white, R denotes red, G denotes green, and B denotes blue.

In one embodiment, the two adjacent sub-pixels of the same pixel set arranged in the column direction render the same voltage polarity.

In one embodiment, the plurality of sub-pixels of the pixels in the same pixel set render the same voltage polarity order.

In one embodiment, in a next frame time, the plurality of data lines transmit the data signal in a polarity inversion mode to drive the plurality of pixels.

In one embodiment, in one frame time, the drive circuit makes one pixel of two column-adjacent pixels become a bright area, and makes the other one pixel of the two column-adjacent pixels become a dark area, wherein the same color of bright area sub-pixels arranged in the column direction render a positive-to-negative polarity ratio of 1:1.

In one embodiment, the display device is a liquid crystal display device.

To achieve the above objective, the present disclosure further discloses a display device. The display device comprises a display panel. The display panel comprises a plurality of gate lines, a plurality of data lines, a plurality of pixels, and a drive circuit. The plurality of data lines are interleaved with the plurality of gate lines, and the plurality of data lines comprise an $n^{th}$ data line and an $(n+1)^{th}$ data line, where n is an odd number. The plurality of pixels are arranged in a row direction and a column direction, wherein each of the pixels comprises plurality of colors of sub-pixels arranged in the row direction. The color arrangement order of the sub-pixels of the four colors of each of the pixels is the same. The plurality of sub-pixels arranged in the row direction are electrically connected to two adjacent gate lines of the corresponding row. Each of the data lines is electrically connected to the two adjacent sub-pixels of the same pixel. Two adjacent pixels arranged in the column direction respectively form a pixel set. Two adjacent pixel sets arranged in the column direction are a first pixel set and a second pixel set. The first pixel set and the second pixel set are respectively connected to a first gate line, a second gate line, a third gate line and a fourth gate line. In the first pixel set or the second pixel set, the first gate line and the fourth gate line are electrically connected to the sub-pixels in the same column, respectively, the second gate line and the third gate line are respectively electrically connected to the sub-pixels in the same column, and the sub-pixels respectively electrically connected to the fourth gate line of the first pixel set and the first gate line of the second pixel set are located in different columns. The drive circuit transmits a data signal to drive the plurality of pixels through the plurality of data lines. In one frame time, the data signal drives the two adjacent sub-pixels of the same pixel through the $n^{th}$ data line or the $(n+1)^{th}$ data line using opposite polarities, the data signal drives the same pixel through the $n^{th}$ data line and the $(n+1)^{th}$ data line using opposite polarities, the data signal drives the two adjacent sub-pixels of the same pixel set in column direction through the $n^{th}$ data line and the $(n+1)^{th}$ data line using the same polarities. The drive circuit makes one pixel of two column-adjacent pixels become a bright area, makes the other one pixel of the two column-adjacent pixels become a dark area, and the same color of bright area sub-pixels arranged in the column direction render a positive-to-negative polarity ratio of 1:1.

As mentioned above, this disclosure discloses a new pixel drive arrangement method, wherein under the connection architecture of the plurality of colors of sub-pixels and the half source driving technology, the same color of bright area sub-pixels arranged in the column direction (vertical direction) in one frame time may render a positive-to-negative polarity ratio of 1:1, and the positive and negative polarities mutually offset to eliminate the vertical crosstalk problem of the display panel caused by the parasitic capacitance coupling, so that the display frame becomes more uniform and the frame taste is enhanced.

BRIEF DESCRIPTION OF THE DRAWINGS

The accompanying drawings are included to provide a further understanding of embodiments of the present application, which constitutes a part of the specification, illustrate embodiments of the present disclosure is used, together and explain the principles of the present disclosure with the description. Apparently, the drawings in the following description are only some embodiments of the present disclosure, those of ordinary skill in the art is concerned, without any creative effort, and may also obtain other drawings based on these drawings. In the following drawings.

DETAILED DESCRIPTION OF INVENTION

Specific structural and functional details disclosed herein are merely representative and are for purposes of describing example embodiments of the present disclosure. However, the present disclosure may be embodied in many alternate forms, and should not be interpreted as being limited to the embodiments set forth herein.

In the description of the present disclosure, it is to be understood that the term "center", "lateral", "upper", "lower", "left", "right", "vertical", "horizontal", "top", "bottom", "inner", "outer" and other indicated orientation or positional relationships are based on the location or position relationship shown in the drawings, and are for convenience of description of the present disclosure only and to simplify the description, and not indicate or imply that refers to devices or elements must have a specific orientation, the orientation of a particular configuration and operation, therefore, cannot be construed as limiting the present disclosure. In addition, the terms "first", "second" are used to indicate or imply relative importance or the number of technical features specified implicitly indicated the purpose of description and should not be understood. Thus, there is defined "first", "second" features may be explicitly or implicitly include one or more of the features. In the description of the present disclosure, unless otherwise specified, the meaning of "more" is two or more. Further, the term "comprising" and any variations thereof are intended to cover non-exclusive inclusion.

In the description of the present disclosure, it is noted that, unless otherwise expressly specified or limited, the terms "mounted," "connected to", "connected" are to be broadly understood, for example, may be a fixed connection, may be a detachable connection, or integrally connected; may be a mechanical connector may be electrically connected; may be directly connected, can also be connected indirectly through intervening structures, it may be in communication the interior of the two elements. Those of ordinary skill in the art, be appreciated that the specific circumstances of the specific meanings in the present disclosure.

The terminology used herein is for describing particular embodiments only and is not intended to limit embodiments to an exemplary embodiment. Unless the context clearly indicates otherwise, singular forms as used herein, "a", "an" are intended to include the plural. It should also be understood that, as used herein the term "comprising" and/or "comprising," as used herein, specify the presence of stated features, integers, steps, operations, elements, and/or components, but do not preclude the presence or addition of one or more other features, integers, steps, operations, elements, components, and/or combinations thereof.

This disclosure will be further described in detail with reference to the accompanying drawings and specific embodiments below.

Figure 1:
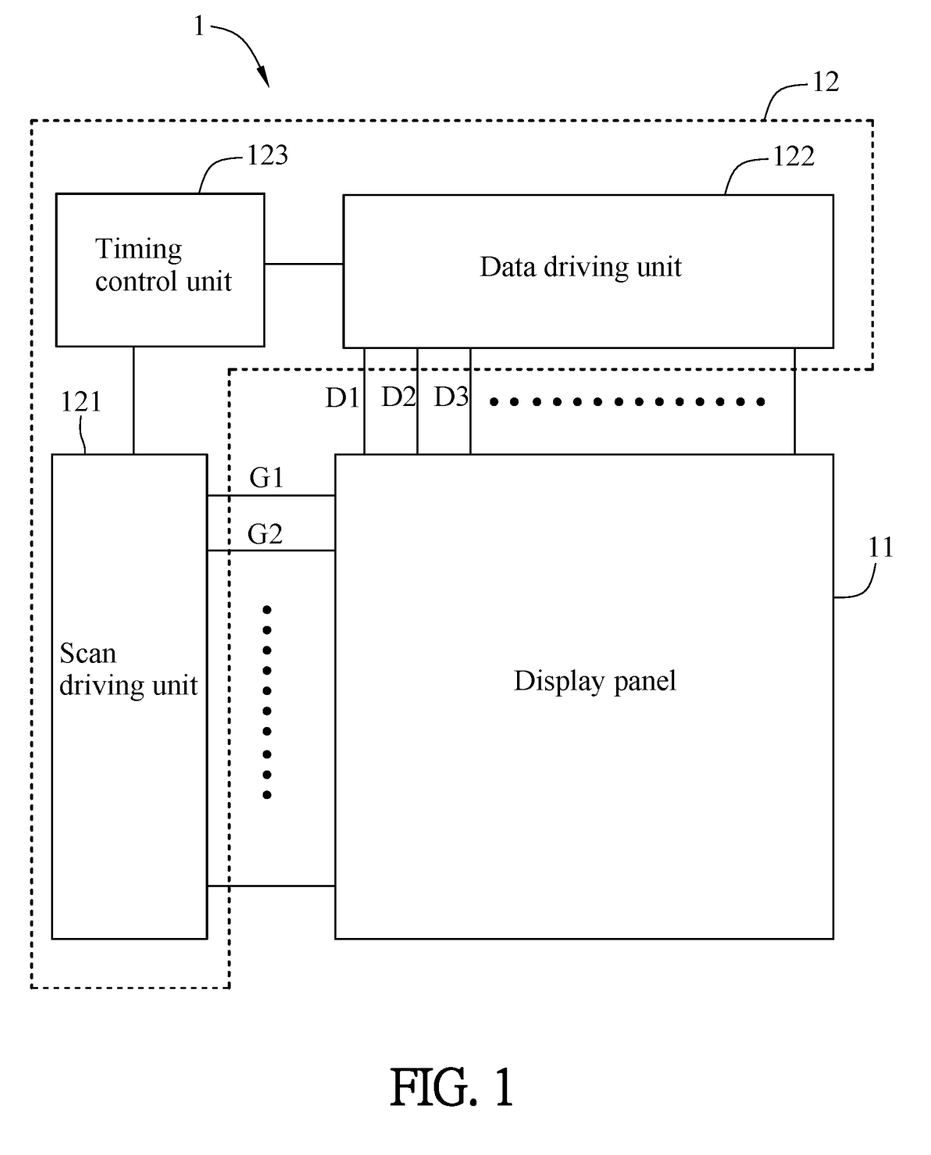
FIG. 1 is a functional block diagram showing a display device of an embodiment of this disclosure.

FIG. 1 is a functional block diagram showing a display device of an embodiment of this disclosure. Referring to FIG. 1, a display device 1 of this embodiment is a liquid crystal display device, and may include a display panel 11 and a drive circuit 12. The display panel 11 includes a plurality of pixels arranged in a row direction and a column direction, a plurality of gate lines (or referred to as gate lines G1, G2, . . . ) and a plurality of data lines (or referred to as source lines D1, D2, D3, . . . ). The plurality of gate lines and the plurality of data lines are interleaved and respectively electrically connected to the plurality of pixels. Each pixel may include plurality of colors of sub-pixels arranged in the row direction.

The drive circuit 12 is electrically connected to the display panel 11, and may drive the plurality of pixels of the display panel 11 to display an image. The drive circuit 12 of this embodiment may include a scan driving unit 121, a data driving unit 122 and a timing control unit 123. The scan driving unit 121 may be coupled to the plurality of pixels through the gate lines, and the data driving unit 122 may be coupled to the plurality of pixels through the data lines. The scan driving unit 121 may respectively output scan signals to turn on the gate lines, and the data driving unit 122 may output plurality of data signals corresponding to the data lines to drive the corresponding pixels. In addition, the timing control unit 123 may transmit a vertical sync signal and a horizontal sync signal to the scan driving unit 121, convert the video signal received from the external port into the data signal used by the data driving unit 122, and transmit the data signal and the horizontal sync signal to the data driving unit 122. In one frame time, when the gate lines are respectively and sequentially turned on by the scan signals, the data driving unit 122 may transmit the data signals corresponding to each row of sub-pixels to each sub-pixel through the data lines, so that the display panel 11 displays the image.

Figure 2A:
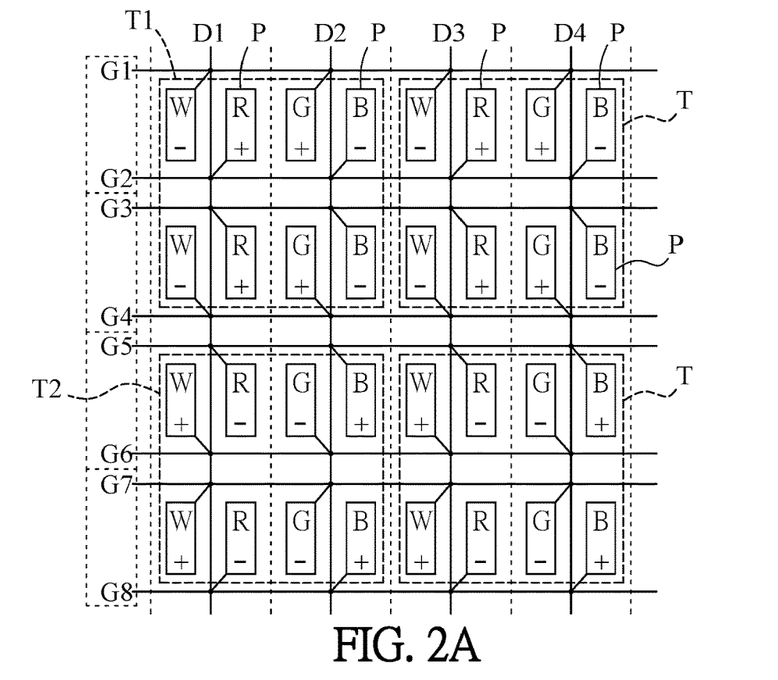
FIGS. 2A and 2B are schematic views respectively showing connections of pixels of the display panel with gate lines and data lines in an embodiment of this disclosure.
Figure 2B:
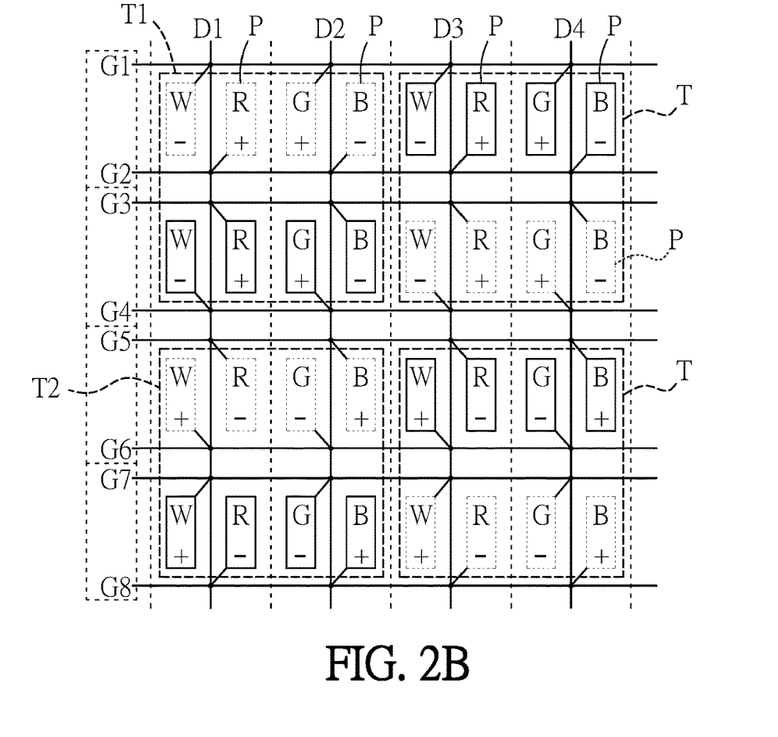

FIGS. 2A and 2B are schematic views respectively showing connections of pixels of the display panel with gate lines and data lines in an embodiment of this disclosure. Please refer to FIGS. 2A and 2B. FIGS. 2A and 2B show the same connection architecture. However, FIG. 2B also shows the bright and dark conditions of the sub-pixels of each pixel (the sub-pixels rendered in dashed lines are dark areas). In FIGS. 2A and 2B, 8 gate lines G1 to G8, 4 data lines D1 to D4 and 4 rows (transverse) of total 8 pixels (32 sub-pixels P) are taken as an example, but this disclosure is not restricted thereto. In different embodiment, more gate lines, data lines and pixels may be designed according to actual requirements.

In FIG. 2A, the 8 gate lines G1 to G8 may be divided into four gate line sets (surrounded by the dashed lines), wherein each set has two gate lines, that is, (G1, G2), (G3, G4) to (G7, G8), and the 4 data lines D1 to D4 are respectively represented by D1 to D4. The display panel 11 has plurality of pixels arranged in the row direction (horizontal direction) and the column direction (vertical direction). Each pixel has plurality of sub-pixels P arranged in the row direction. The plurality of sub-pixels P arranged in the row direction are respectively electrically connected to two adjacent gate lines of the corresponding row, and each of the data lines is respectively electrically connected to the two adjacent sub-pixels P of the same pixel. Specifically speaking, for example, the gate lines (G1, G2) may simultaneously drive two pixels of the first row (each pixel includes four sub-pixels P of white (W), red (R), green (G) and blue (B). The gate lines (G3, G4) may simultaneously drive two pixels of the second row, and the data lines D1, D2, D3 and D4 are respectively electrically connected to the two adjacent sub-pixels P of the same pixel. That is, each pixel is electrically connected to two data lines, respectively. Similarly, as shown in FIG. 2A, each of the data lines is connected to the two adjacent sub-pixels P of the same pixel. Therefore, the display device 1 of this embodiment adopts the half source driving (HSD) technology. In addition to reducing of the number of the source driver ICs, it is also advantageous to the improvement of the production capacity.

Each pixel of this embodiment includes four colors (WRGB) of sub-pixels P arranged in the row direction, the four colors of sub-pixels P of each pixel of the same row have the same order, and sub-pixels P in the same column have the same color. In addition, in two adjacent data lines connected to the same pixel: the $n^{th}$ data line and the $(n+1)^{th}$ data line are represented by D(n) and D(n+1) (n is an odd number), the colors of the sub-pixels P connected to the data line D(n) from top to bottom are sequentially WRRWRWWR, and the order is repeated; and the colors of the sub-pixels P connected to the data line D(n+1) from top to bottom are sequentially GBBGBGGB, and the order is repeated.

In addition, two adjacent pixels arranged in the column direction may form a pixel set T (surrounded by the dashed lines). Taking the pixel set in the upper left corner (labeled as T1) as an example, the sub-pixels P of the pixel in the upper half portion sequentially have a WRGB stripe arrangement, and the sub-pixels P of the pixel in the lower half portion sequentially have a WRGB arrangement. In addition, in the first pixel set, the four sub-pixels P in the upper half portion are respectively electrically connected to the same set of gate lines G1 and G2 of the corresponding row and the two adjacent data lines D1 and D2 of the corresponding column, and the four sub-pixels P in the lower half portion are respectively electrically connected to the same set of gate lines G3 and G4 of the corresponding row and the corresponding two adjacent data lines D1 and D2. The color of each pixel above takes the WRGB as an example, but it is not restricted thereto. In different embodiments, different four colors are also possible, such as RGBY, RGBC or others, and this disclosure is not restricted thereto.

The two adjacent pixels arranged in the column direction may be a first pixel set T1 and a second pixel setT 2. The first pixel set T1 and the second pixel setT 2 are sequentially connected to a first gate line, a second gate line, a third gate line and a fourth gate line. In other words, in this embodiment, as shown in FIG. 2A, the first pixel set T1 are sequentially connected to the first gate line (G1), the second gate line (G2), the third gate line (G3), and the fourth gate line (G4). The second pixel set T2 are also connected to the first gate line (G5), the second gate line (G6), the third gate line (G7) and the fourth gate Line (G8). In the first pixel set T1, the first gate line (G1) and the fourth gate line (G4) are electrically connected to the sub-pixels P in the same column, and the second gate line (G2) and the third gate line (G3) electrically connect the sub-pixels P in the same column. In the second pixel set T2, the first gate line (G5) and the fourth gate line (G8) are electrically connected to the sub-pixels P in the same column, the second gate line (G6) and the third gate line G7) are respectively electrically connected to the sub-pixels P in the same column, and the sub-pixels P respectively electrically connected to the fourth gate line (G4) of the first pixel set T1 and the first gate line (G5) of the second pixel set T2 are located in different columns, but are electrically connected with the same data line (D1) at the same time.

In the present embodiment, the first gate line (G1) of the first pixel set T1 is electrically connected to the odd-numbered sub-pixels P of the first row of pixels, the second gate lines (G2) is electrically connected to the even-numbered sub-pixels P of the first row of pixels, the third gate line (G3) is respectively electrically connected to the even-numbered sub-pixels P of the second row of pixels, and the fourth gate line (G4) is electrically connected to the odd-numbered sub-pixels P of the second row of pixels. In the second pixel setT 2, the first gate line (G5) is electrically connected to the even-numbered sub-pixels P of the third row of pixels, the second gate line (G6) is electrically connected to the odd-numbered sub-pixels of the third row of pixels, the third gate line (G7) is respectively electrically connected to the odd-numbered sub-pixels P of the fourth row of pixels, and the fourth gate line (G8) is electrically connected to the even-numbered sub-pixels P of the fourth row of pixels, and so on, but this disclosure is not restricted thereto. In a different embodiment, the first gate line (G1) of the first pixel set T1 may be electrically connected to the even-numbered sub-pixels P of the first row of pixels, and the second gate line (G2) may be electrically connected to the odd-numbered sub-pixels P of the first row of pixels (the odd and even numbers are from left to right), the third gate line (G3) may be electrically connected to the odd-numbered sub-pixel P of the second row of pixels, and the fourth gate line (G4) may be electrically connected to the even-numbered sub-pixels P of the second row of pixels. The first gate line (G5) of the second pixel set T2 may be electrically connected to the odd-numbered sub-pixels P of the third row of pixels, the second gate lines (G6) may be electrically connected to the even-numbered sub-pixels of the third row of pixels, the third gate line (G7) may be electrically connected to the even-numbered sub-pixels P of the fourth row of pixels, and the fourth gate line (G8) may be electrically connected to the odd-numbered sub-pixels P of the fourth row of pixels.

In addition, each pixel may include a first sub-pixel P, a second sub-pixel P, a third sub-pixel P, and a fourth sub-pixel P arranged in order. The first sub-pixel P and the second sub-pixel P in each pixel are electrically connected to a corresponding one of the $n^{th}$ data line and the $(n+1)^{th}$ data line. The third sub-pixel P and the fourth sub-pixel P are electrically connected to the other corresponding one of the $n^{th}$ data line and the $(n+1)^{th}$ data line (the first to fourth ones are also counted from left to right). In this embodiment, taking the data lines D1(D3) and D2(D4) as an example, the data line D1(D3) is electrically connected to the first sub-pixel P and the second sub-pixel P of each pixel in the vertical direction, and the data line D2(D4) is electrically connected to the third sub-pixel P and the fourth sub-pixel P of each pixel in the vertical direction, and so on.

Figure 3:
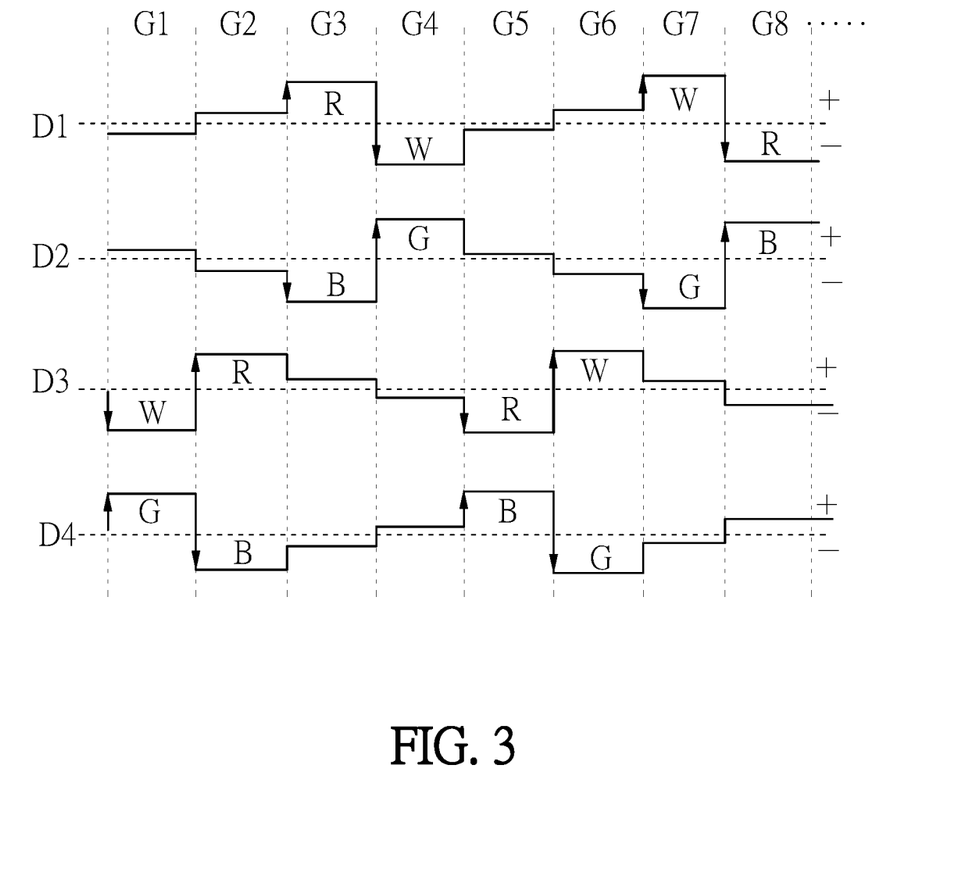
FIG. 3 is a schematic view showing waveforms of the data signal corresponding to the gate line in one frame time in the connection architecture of the sub-pixel with the gate line and the data line of FIG. 2B.

Referring to FIGS. 2A and 2B in conjunction with FIG. 3, wherein FIG. 3 is a schematic view showing waveforms of the data signal corresponding to the gate line in one frame time in the connection architecture of the sub-pixel with the gate line and the data line of FIG. 2B. In a driving method of the display device of this embodiment, under the above-mentioned connection architecture, the data signal is transmitted through the plurality of data lines by the driving circuit 12 to drive the plurality of pixels of the display panel 11, wherein in one frame time, the data signal drives the two adjacent sub-pixels P of the same pixel through the $n^{th}$ data line or the $(n+1)^{th}$ data line using opposite polarities, the data signal drives the same pixel through the $n^{th}$ data line and the $(n+1)^{th}$ data line using opposite polarities (i.e., at the same time, if the $n^{th}$ data line has the positive polarity, then the $(n+1)^{th}$ data line has the negative polarity; or vice versa), and the data signal drives the two adjacent sub-pixels P in the column-direction through the $n^{th}$ data line and the $(n+1)^{th}$ data line using the same polarities.

In this embodiment, as shown in FIG. 2A, the data signal drives the two adjacent sub-pixels P of the same pixel through the $n^{th}$ data line and the $(n+1)^{th}$ data line that respectively includes two polarities (the positive polarity and the negative polarity), and in one frame time, polarity orders of the sub-pixels P driven by the data signal through the $n^{th}$ data line in the column direction are negative, positive, positive, negative, negative, positive, positive, and negative. In one frame time, polarity orders of the sub-pixels P driven by the data signal through the $(n+1)^{th}$ data line in the column direction are positive, negative, negative, positive, positive, negative, negative, and positive. In addition, in the same frame time, the polarity orders of the sub-pixels P driven through the $n^{th}$ data line and the $(n+1)^{th}$ data line in the column direction are respectively repeated. That is, the polarity orders of the sub-pixels P driven through the $n^{th}$ data line in the column direction are repeatedly negative, positive, positive, negative, negative, positive, positive, and negative, and the polarity orders of the sub-pixels P driven through the $(n+1)^{th}$ data line in the column direction repeat positive, negative, negative, positive, positive, negative, negative, and positive. Thus, in one frame time, polarities of the two adjacent sub-pixels P of the same pixel driven by the data signal through the $n^{th}$ data line and the $(n+1)^{th}$ data line are opposite; polarities of the same pixel driven by the data signal through the $n^{th}$ data line and the $(n+1)^{th}$ data line are opposite; and polarities of the two adjacent sub-pixels P of the same pixel in the column direction driven by the data signal through the $n^{th}$ data line and the $(n+1)^{th}$ data line are the same polarities.

Therefore, the data signal driving the sub-pixels P with the plurality of colors of each pixel includes two kinds of voltage polarities. In addition, the two adjacent sub-pixels P of the same pixel connected to the $n^{th}$ data line and the $(n+1)^{th}$ data have the same polarity. The data signal drives the two adjacent sub-pixels P of the first pixel set T1 and the second pixel set T2 through the $n^{th}$ data line or the $(n+1)^{th}$ data line using opposite polarities.

In addition, in a next frame time, the driving polarity of the data signal employs the polarity inversion driving mode, so that the properties of liquid crystal molecules are not destroyed. In other words, in this embodiment, in a next frame time, polarity orders of the sub-pixel P in the column direction driven by the data signal through the $n^{th}$ data line and the $(n+1)^{th}$ data line are respectively: positive, negative, negative, positive, positive, negative, negative and positive; and negative, positive, positive, negative, negative, positive, positive and negative; and in the next frame time, polarity orders of the sub-pixels P in the column direction driven by the data signal through the $n^{th}$ data line and the $(n+1)^{th}$ data line are respectively repeatedly positive, negative, negative, positive, positive, negative, negative and positive; and negative, positive, positive, negative, negative, positive, positive and negative.

With the connection architecture and the driving method of the gate line, the data line and the sub-pixel P, as shown in FIG. 2B, the drive circuit 12 can make the first pixel set T1 have the following properties within one frame time: the voltage polarities rendered by the four colors of sub-pixels P of the two pixels are respectively negative, positive, positive and negative (−++−); and the voltage polarities rendered by the plurality of colors of sub-pixels P of the two pixels in the second pixel set are respectively positive, negative, negative and positive (+−−+); or vice versa. That is, the voltage polarities rendered by the plurality of colors of sub-pixels P of the two pixels in the first pixel set T1 are respectively positive, negative, negative, positive (+−−+), and the voltage polarities rendered by the plurality of colors of sub-pixels P of the two pixels in the second pixel set T2 are respectively negative, positive, positive and negative (−++−). In addition, the plurality of sub-pixels P of each pixel of the same row render the same voltage polarity order, and two adjacent sub-pixels P of the same pixel set arranged in the column direction render the same voltage polarities. However, in different pixel sets, two adjacent sub-pixels P in the column direction render the opposite voltage polarities. In the next frame time, the rendered voltage polarity for all sub-pixels P is opposite to that of the previous frame time.

In addition, in one frame time, the drive circuit 12 also makes one pixel of two column-adjacent pixels become a bright area, and makes the other one pixel of the two column-adjacent pixels become a dark area. As shown in FIG. 2B, in this embodiment, one pixel of the two column-adjacent pixels becomes a bright area, and the other one pixel of the two column-adjacent pixels becomes a dark area. Also, in each pixel set T, one pixel becomes a dark area, and another pixel becomes a bright area. That is, the display panel of this embodiment adopts four colors of sub-pixels and collocates with the two pixel rendering technology.

Therefore, as shown in FIG. 3, in the above-mentioned connection architecture, the same color of bright area sub-pixels arranged in the column direction P render a positive-to-negative polarity ratio of 1:1. For example, for the data line D1, the number of positive polarity and the number of negative polarity of the red (R) sub-pixel P are equal to 1; and the number of positive polarities and the number of negative polarities of the white (W) sub-pixel P are equal to 1. Again, for the data line D2, the number of positive polarity and the number of negative polarity of the blue (B) sub-pixel P are equal to 1; and the number of positive polarities and the number of negative polarities of the green (G) sub-pixel P are equal to 1. The number of positive and negative polarities corresponding to other data lines D3 and D4 can refer to FIG. 3, and detailed descriptions thereof will be omitted.

As mentioned hereinabove, in the display device of this embodiment, a new pixel driving configuration is proposed. Under the connection architecture of the four colors of sub-pixel and the half source driving technology, the same color of bright area sub-pixels P arranged in the column direction (vertical direction) within one frame time render a positive-to-negative polarity ratio of 1:1, the positive and negative polarities are used to offset the vertical crosstalk problem of the display panel caused by the parasitic capacitance coupling, thereby making the display frame more uniform and enhancing the frame taste.

Please refer to FIGS. 4A to 4D, wherein FIGS. 4A to 4D are schematic views respectively showing manufacturing processes of four color filter layers of the display device of an embodiment.

Figure 4A:
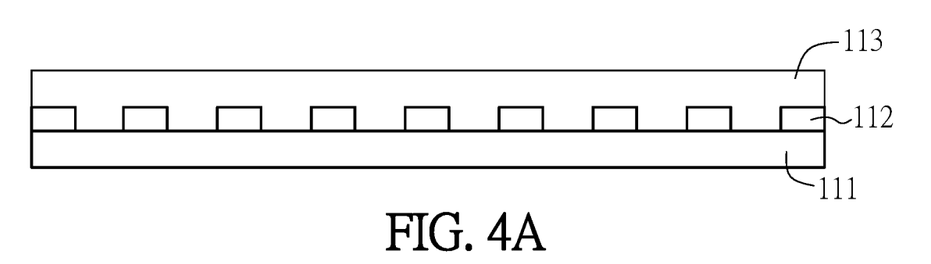
FIGS. 4A to 4D are schematic views respectively showing manufacturing processes of four color filter layers of the display device of an embodiment.
Figure 4B:
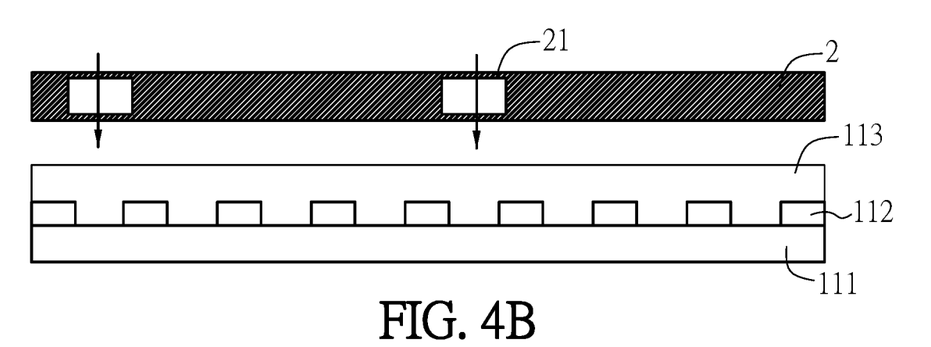
Figure 4C:
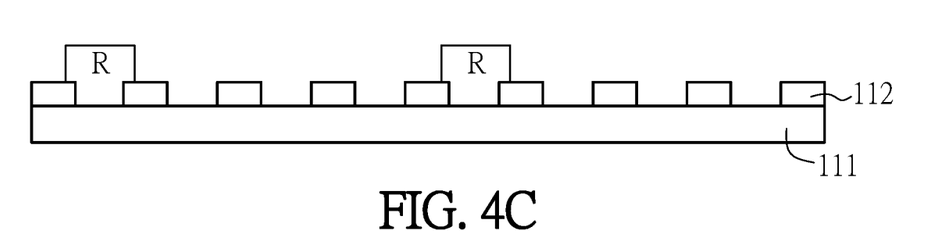
Figure 4D:
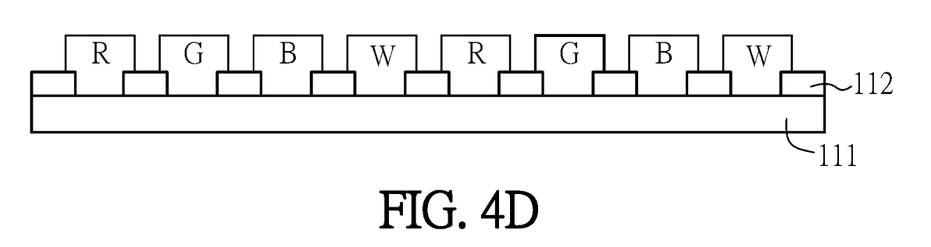

As shown in FIG. 4A, the first manufacturing process of four color filter layers of the display device of this embodiment includes: forming a black matrix layer 112 with spaced portions on a substrate 111, and forming the first color filter layer (such as R) by, for example, coating on the substrate 111 and the black matrix layer 112; then, as shown in FIG. 4B, the second process includes: performing the exposure process by a mask 2, wherein an opening 21 of the mask 2 corresponds to the installation position of the first color sub-pixel; then, as shown in FIG. 4C, the third process includes: performing the development process to define the position of the first color (R) filter layer on the substrate 111; and after that, the first process, the second process and the third process are repeated to define the positions of four colors (R, G, B, W) filter layers on the substrate 111, thereby obtaining the arrangement of the four colors of sub-pixels P. The black matrix layer 112 may be disposed around the four color filter layers.

In summary, this disclosure discloses a new pixel drive arrangement method, wherein under the connection architecture of the plurality of colors of sub-pixels and the half source driving technology, the same color of bright area sub-pixels arranged in the column direction (vertical direction) in one frame time may render a positive-to-negative polarity ratio of 1:1, and the positive and negative polarities mutually offset to eliminate the vertical crosstalk problem of the display panel caused by the parasitic capacitance coupling, so that the display frame becomes more uniform and the frame taste is enhanced.

Although the present disclosure has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present disclosure.

What is claimed is:

1. A display device, comprising a display panel, the display panel comprising:

a plurality of gate lines;
a plurality of data lines, interleaved with the plurality of gate lines, the plurality of data lines comprise an $n^{th}$ data line and an $(n+1)^{th}$ data line, where n is an odd number;
a plurality of pixels, arranged in a row direction and a column direction, wherein each of the pixels comprises a plurality of colors of sub-pixels arranged in the row direction, the plurality of sub-pixels arranged in the row direction are electrically connected to two adjacent gate lines of the corresponding row, each of the data lines is electrically connected to the two adjacent sub-pixels of the same pixel, two adjacent pixels arranged in the column direction respectively form a pixel set, two adjacent pixel sets arranged in the column direction are a first pixel set and a second pixel set, the first pixel set and the second pixel set are respectively connected to a first gate line, a second gate line, a third gate line and a fourth gate line, in the first pixel set or the second pixel set, the first gate line and the fourth gate line are electrically connected to the sub-pixels in the same column, respectively, the second gate line and the third gate line are respectively electrically connected to the sub-pixels in the same column, and the sub-pixels respectively electrically connected to the fourth gate line of the first pixel set and the first gate line of the second pixel set are located in different columns; and
a drive circuit, transmitting a data signal to drive the plurality of pixels through the plurality of data lines,
wherein in one frame time, the data signal drives the two adjacent sub-pixels of the same pixel through the $n^{th}$ data line or the $(n+1)^{th}$ data line using opposite polarities, the data signal drives the same pixel through the $n^{th}$ data line and the $(n+1)^{th}$ data line using opposite polarities, and the data signal drives the two adjacent sub-pixels of the same pixel set in column-direction through the $n^{th}$ data line and the $(n+1)^{th}$ data line using the same polarities.

2. The display device according to claim 1, wherein the plurality of gate lines and the plurality of data lines are interleaved and respectively electrically connected to the plurality of pixels.

3. The display device according to claim 1, wherein the drive circuit comprises a scan driving unit and a data driving unit, the scan driving unit is coupled to the plurality of pixels through the plurality of gate lines, and the data driving unit is coupled to the plurality of pixels through the plurality of data lines.

4. The display device according to claim 3, wherein in one frame time, when the plurality of gate lines are sequentially turned on respectively, the data driving unit transmits the data signal corresponding to each row of sub-pixels to each of the sub-pixels through the plurality of data lines to display an image in the display panel.

5. The display device according to claim 1, wherein each of the pixels is electrically connected to two of the data lines.

6. The display device according to claim 1, wherein the plurality of colors of the sub-pixels of each of the pixels of the same row have the same order.

7. The display device according to claim 1, wherein the $n^{th}$ data line and the $(n+1)^{th}$ data line are connected to the same pixel.

8. The display device according to claim 1, wherein the data signal drives the two adjacent sub-pixels of the first pixel set and the second pixel set arranged in the column direction through the $n^{th}$ data line or the $(n+1)^{th}$ data line using opposite polarities.

9. The display device according to claim 1, wherein the two adjacent sub-pixels of the same pixel connected to the $n^{th}$ data line and the $(n+1)^{th}$ data line have the same polarity.

10. The display device according to claim 1, wherein the plurality of sub-pixels of each of the pixels in the same row have voltage polarity in the same order.

11. The display device according to claim 1, wherein each of the pixels comprises sub-pixels of four colors arranged in the row direction.

12. The display device according to claim 11, wherein the four colors of the sub-pixels are respectively WRGB, RGBY or RGBC, where W denotes white, R denotes red, G denotes green, B denotes blue, Y denotes yellow, and C denotes cyan.

13. The display device according to claim 1, wherein: in one frame time, polarity orders of the sub-pixels driven by the data signal through the $n^{th}$ data line in the column direction are negative, positive, positive, negative, negative, positive, positive, and negative, and the orders are respectively repeated; and polarity orders of the sub-pixels driven by the data signal through the $(n+1)^{th}$ data line in the column direction are positive, negative, negative, positive, positive, negative, negative, and positive, and the orders are respectively repeated.

14. The display device according to claim 1, wherein the colors of the sub-pixels connected to the $n^{th}$ data line are sequentially WRRWRWWR, and the order is repeated; and the colors of the sub-pixels connected to the $(n+1)^{th}$ data line are sequentially GBBGBGGB, and the order is repeated, where W denotes white, R denotes red, G denotes green, and B denotes blue.

15. The display device according to claim 1, wherein the two adjacent sub-pixels of the same pixel set arranged in the column direction render the same voltage polarity.

16. The display device according to claim 1, wherein the plurality of sub-pixels of the pixels in the same pixel set render the same voltage polarity order.

17. The display device according to claim 1, wherein in a next frame time, the plurality of data lines transmit the data signal in a polarity inversion mode to drive the plurality of pixels.

18. The display device according to claim 1, wherein in one frame time, the drive circuit makes one pixel of two column-adjacent pixels become a bright area, and makes the other one pixel of the two column-adjacent pixels become a dark area, wherein the same color of bright area sub-pixels arranged in the column direction render a positive-to-negative polarity ratio of 1:1.

19. The display device according to claim 1, wherein the display device is a liquid crystal display device.

20. A display device, comprising a display panel, the display panel comprising:
a plurality of gate lines;
a plurality of data lines, interleaved with the plurality of gate lines, the plurality of data lines comprise an $n^{th}$ data line and an $(n+1)^{th}$ data line, where n is an odd number;
a plurality of pixels, arranged in a row direction and a column direction, wherein each of the pixels comprises a plurality of colors of sub-pixels arranged in the row direction, the color arrangement order of the sub-pixels of the four colors of each of the pixels is the same, the plurality of sub-pixels arranged in the row direction are electrically connected to two adjacent gate lines of the corresponding row, each of the data lines is electrically connected to the two adjacent sub-pixels of the same pixel, two adjacent pixels arranged in the column direction respectively form a pixel set, two adjacent pixel sets arranged in the column direction are a first pixel set and a second pixel set, the first pixel set and the second pixel set are respectively connected to a first gate line, a second gate line, a third gate line and a fourth gate line, in the first pixel set or the second pixel set, the first gate line and the fourth gate line are electrically connected to the sub-pixels in the same column, respectively, the second gate line and the third gate line are respectively electrically connected to the sub-pixels in the same column, and the sub-pixels respectively electrically connected to the fourth gate line of the first pixel set and the first gate line of the second pixel set are located in different columns; and a drive circuit, transmitting a data signal to drive the plurality of pixels through the plurality of data lines, wherein in one frame time, the data signal drives the two adjacent sub-pixels of the same pixel through the $n^{th}$ data line or the $(n+1)^{th}$ data line using opposite polarities, the data signal drives the same pixel through the $n^{th}$ data line and the $(n+1)^{th}$ data line using opposite polarities, the data signal drives the two adjacent sub-pixels of the same pixel set in column direction through the $n^{th}$ data line and the $(n+1)^{th}$ data line using the same polarities, the drive circuit makes one pixel of two column-adjacent pixels become a bright area, makes the other one pixel of the two column-adjacent pixels become a dark area, and the same color of bright area sub-pixels arranged in the column direction render a positive-to-negative polarity ratio of 1:1.

* * * * *